(12) United States Patent
Kimura et al.

(10) Patent No.: US 11,402,023 B2
(45) Date of Patent: Aug. 2, 2022

(54) MECHANICAL SEAL

(71) Applicant: EAGLE INDUSTRY CO., LTD., Tokyo (JP)

(72) Inventors: Tadahiro Kimura, Tokyo (JP); Yasuhiro Ikeda, Tokyo (JP); Masamitsu Sanada, Tokyo (JP); Masatoshi Itadani, Tokyo (JP)

(73) Assignee: EAGLE INDUSTRY CO., LTD.

( * ) Notice: Subject to any disclaimer, the term of this patent is extended or adjusted under 35 U.S.C. 154(b) by 4 days.

(21) Appl. No.: 16/976,018

(22) PCT Filed: Mar. 13, 2019

(86) PCT No.: PCT/JP2019/010146
§ 371 (c)(1),
(2) Date: Aug. 26, 2020

(87) PCT Pub. No.: WO2019/181671
PCT Pub. Date: Sep. 26, 2019

(65) Prior Publication Data
US 2021/0003221 A1   Jan. 7, 2021

(30) Foreign Application Priority Data
Mar. 23, 2018   (JP) .............................. JP2018-056154

(51) Int. Cl.
*F16J 15/34*   (2006.01)
(52) U.S. Cl.
CPC .................... *F16J 15/3496* (2013.01)

(58) Field of Classification Search
CPC ........ F16J 15/3496; F16J 15/34; F16J 15/3404
See application file for complete search history.

(56) References Cited

U.S. PATENT DOCUMENTS

| 5,139,425 A | 8/1992 | Daviet et al. ................... 439/17 |
| 6,229,676 B1 | 5/2001 | Prater ......................... 360/265.3 |
| 10,247,309 B2 | 4/2019 | Nakamura et al. .. F16J 15/3484 |
| 2006/0006602 A1 | 1/2006 | Roddis .......................... 277/378 |

(Continued)

FOREIGN PATENT DOCUMENTS

| CA | 2 893 739 | 1/2016 | ............... F16J 15/16 |
| CN | 201288822 | 8/2009 | ............... F16J 15/16 |
| CN | 104481916 | 4/2015 | ............. F04D 29/12 |

(Continued)

OTHER PUBLICATIONS

International Preliminary Report on Patentability issued in PCT/JP2019/010146, dated Sep. 29, 2020, 9 pages.

(Continued)

*Primary Examiner* — Gilbert Y Lee
(74) *Attorney, Agent, or Firm* — Hayes Soloway P.C.

(57) ABSTRACT

A mechanical seal capable of preventing charge accumulation on a rotary shaft includes a fixed sealing element which is held at an inner periphery of housing members of machines to be installed and has at least a fixed seal ring, and a rotating sealing element which is held at an outer periphery of a rotary shaft rotatably supported in the housing members and has at least a rotating seal ring. A conductive element is provided between the fixed sealing element 10 and the rotary shaft or a rotary shaft member fixed to the rotary shaft.

20 Claims, 11 Drawing Sheets

(56) References Cited

U.S. PATENT DOCUMENTS

| | | | | |
|---|---|---|---|---|
| 2011/0129176 A1 | 6/2011 | Koma et al. | ................ | 384/484 |
| 2021/0003221 A1* | 1/2021 | Kimura | ................ | F16J 15/3496 |

FOREIGN PATENT DOCUMENTS

| | | | | |
|---|---|---|---|---|
| CN | 105114626 | 12/2015 | ................ | F16J 15/16 |
| CN | 105720749 | 6/2016 | ................ | H02K 11/40 |
| CN | 205677871 | 11/2016 | ................ | F04D 29/10 |
| CN | 106369163 | 2/2017 | ................ | F16J 15/16 |
| CN | 107407421 | 11/2017 | ................ | F16J 15/34 |
| JP | S59-139495 | 9/1984 | ................ | B63H 23/36 |
| JP | H3-68677 | 7/1991 | ................ | F16J 15/34 |
| JP | H4-62391 | 5/1992 | ................ | F04D 13/08 |
| JP | 5-157096 | 6/1993 | ................ | F04D 29/12 |
| JP | 2001-309604 | 11/2001 | ................ | H02K 5/16 |
| JP | 2010-242623 | 10/2010 | ................ | F04D 29/043 |

OTHER PUBLICATIONS

Extended European Search Report issued in EP Patent Appln. Serial No. 19771215.1-1015, dated Nov. 19, 2021, 7 pages.
First Office Action issued in CN Patent Appln. Serial No. 201980015697.0, dated Dec. 7, 2021, with English translation, 13 pages.
International Search Report (w/ English Translation) and Written Opinion issued in PCT/JP2019/010146, dated Jun. 18, 2019, 10 pages.

* cited by examiner

MECHANICAL SEAL

TECHNICAL FIELD

The present invention relates to a mechanical seal for sealing a rotary shaft.

BACKGROUND ART

Conventionally, in order to prevent a sealed fluid in the interior of a housing of an automobile water pump, a motor reducer, or the like from leaking to an atmosphere side, there is proposed a mechanical seal for sealing a space, for example, between the housing and a rotary shaft.

For example, a mechanical seal provided on a rotary shaft of an automotive water pump described in Patent Citation 1 is configured to bias a sealing ring fixed to a housing against a mating ring fixed to the rotary shaft by biasing means to bring sliding surfaces of the mating ring and the seal ring into sliding contact with each other, thereby sealing a space between the housing and the rotary shaft. The rotary shaft is made of metal, and extends through the interior of the housing to be supported rotatably relative to an inner circumference of the housing via a ball bearing externally fitted to an outer circumference of the rotary shaft.

Further, in the automotive water pump described in the Patent Citation 1, a harness drawn from a positive terminal of an electromagnetic coil constituting an electromagnetic clutch for connecting and disconnecting a rotational force transmitted to the rotary shaft is connected to a positive electrode of a battery, and a harness drawn from a negative terminal is grounded to the housing.

CITATION LIST

Patent Literature

Patent Citation 1: JP 2010-242623 A (Paga 4, FIG. 2)

SUMMARY OF INVENTION

Technical Problem

Meanwhile, in a motor with high efficiency, the rotary shaft tends to be easily electrified due to friction of a ball bearing portion, friction of a mechanical seal portion, contact with a sealed fluid, and the like. In Patent Citation 1, the contact between the rotary shaft and the ball bearing is likely to be brought into a non-contact state, and the rotary shaft is brought into an electrically floating state with respect to the housing. Therefore, electric charge is accumulated on the rotary shaft, and when the electric charge accumulated on the rotary shaft exceeds a threshold of minimum electric resistance for passing electricity through the ball bearing, electric discharge, which is an instantaneous burst of electrical energy, occurs, which may damage the ball bearing.

The present invention has been made in view of such a problem, and an object of the present invention is to provide a mechanical seal capable of preventing charge accumulation on a rotary shaft.

Solution to Problem

In order to solve the above problems, a mechanical seal according to the present invention comprises a fixed sealing element including at least a fixed seal ring and held at an inner periphery of a housing of a machine in which the mechanical seal is to be installed, and a rotating sealing element including at least a rotating seal ring and held at an outer periphery of a rotary shaft rotatably supported in the housing, wherein a conductive element is provided between the fixed sealing element and the rotary shaft or a rotary shaft member fixed to the rotary shaft. According to the aforesaid feature, the electric charge electrified on the rotary shaft can be released to the housings by the conductive element provided between the fixed sealing element and the rotary shaft or the rotary shaft member, and thus the accumulation of the electric charge on the rotary shaft can be prevented.

It may be preferable that the conductive element is fixed to the fixed sealing element and is capable of energizing the rotary shaft. According to this preferable configuration, since the conductive element is provided in the fixed sealing element which does not rotate together with the rotary shaft, the conductive element has high structural stability, and a state of energizing the rotary shaft is easily maintained.

It may be preferable that the conductive element is fixed to the fixed sealing element, and is capable of energizing the rotary shaft member. According to this preferable configuration, the material and surface shape of the rotary shaft member can be selected and designed so as to be suitable for the conductive element, so that an energized state is easily maintained.

It may be preferable that the rotary shaft member has a holding portion for holding the rotating seal ring. According to this preferable configuration, the conductive element can be incorporated into the mechanical seal to form one unit, and the distance of a gap between the fixed sealing element and the rotary shaft member, in which the conductive element is provided, is kept constant, so that energization can be ensured.

It may be preferable that the fixed sealing element is an annular holder which is attached to the inner periphery of the housing, the annular holder holding the fixed seal ring and having electrical conductivity. According to this preferable configuration, the conductive element can be positioned by simply attaching the holder to the inner periphery of the housing, and the electric charge electrified on the rotary shaft can be released through the conductive element and the holder to the housing.

It may be preferable that the fixed seal ring has electrical conductivity. According to this preferable configuration, the electric charge becomes less likely to be electrified on the fixed seal ring, so that the electric charge electrified on the rotary shaft is easily released through the conductive element and the fixed sealing element to the housing.

It may be preferable that a plurality of the conductive elements is arranged in a circumferential direction. According to this preferable configuration, for an inclination of the rotary shaft, the electric charge electrified on the rotary shaft can be released through any of the conductive elements to the housing, and a mechanical seal with low torque can be obtained.

It may be preferable that the conductive element has a free end brought into contact with the rotary shaft or the rotary shaft member so as to bend in an axial direction. According to this preferable configuration, even when the rotary shaft rotates in both directions, a contact state of the free end of the conductive element can be easily maintained.

It may be preferable that the conductive element comprises a conductor and biasing means which has electrical conductivity and which biases the conductor toward the rotary shaft. According to this preferable configuration, for vibration due to disturbance or the like, a contact state of the conductive element can be easily maintained.

It may be preferable that the conductive element is formed of thin plates having plate surfaces arranged side by side in a circumferential direction. According to this preferable configuration, a wide contact area between the thin plates and the rotary shaft or the rotary shaft member can be secured.

It may be preferable that the conductive element is formed of a magnet and a magnetic fluid. According to this preferable configuration, contact resistance can be reduced.

It may be preferable that the conductive element is a discharge needle having a free end in a non-contact state. According to this preferable configuration, since the free end of the conductive element is always in a non-contact state, wear due to physical contact of the conductive element does not occur.

DESCRIPTION OF EMBODIMENTS

Modes for implementing a mechanical seal according to the present invention will be described below based on embodiments.

First Embodiment

A mechanical seal according to a first embodiment of the present invention, which seals between a housing formed by housing members 50, 80 and a rotary shaft of a motor M as a machine in which the mechanical seal is to be installed and which drives an electric vehicle to travel, will be described with reference to FIGS. 1 to 3. The interior of the housing of the motor will be referred to as the atmosphere side, and the interior of the housing of a reducer will be referred to as an oil side as a sealed fluid, with the mechanical seal interposed therebetween.

Figure 1:
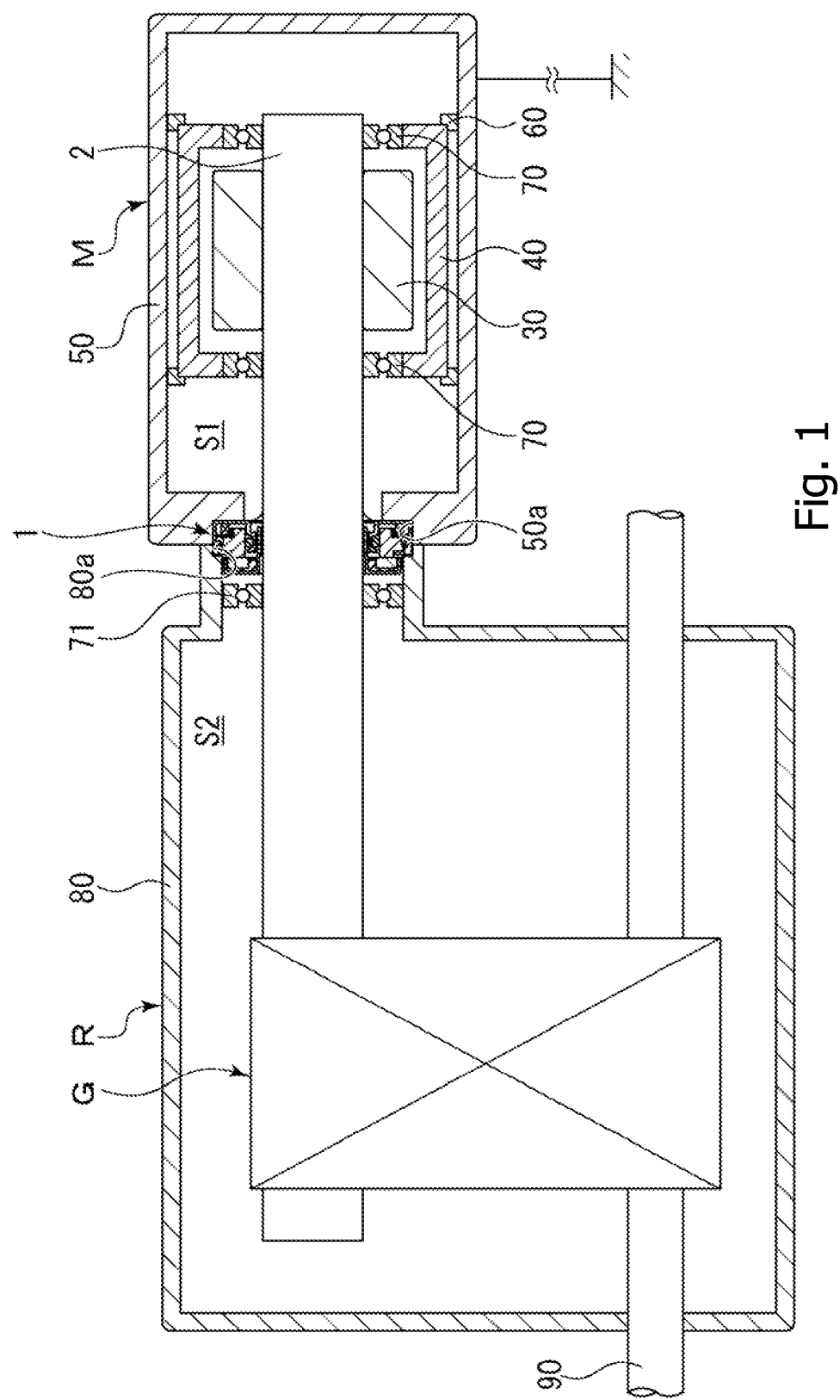
FIG. 1 is a view showing a motor and a reducer to which a mechanical seal according to a first embodiment of the present invention is applied.

As shown in FIG. 1, the motor M includes a rotary shaft 2 made of a material having electrical conductivity such as stainless steel, a rotor 30 fixed to the rotary shaft 2, an annular stator 40 positioned radially spaced around an outer periphery of the rotor 30, and a housing member 50 which rotatably supports the rotary shaft 2 and places the rotor 30 and the stator 40 therein. The stator 40 is fixed to an inner peripheral surface of the housing member 50 by fixing means 60, and the rotor 30 is rotatably supported via a pair of ball bearings 70 on the radially inner side of the stator 40. The rotor 30 is an electromagnet formed by winding a coil, and the stator 40 is a permanent magnet. When a power source (not shown) energizes the coil constituting the rotor 30, a magnetic force is generated, and the rotor 30 and the rotary shaft 2 fixed to the rotor 30 rotates integrally. The housing member 50 of the motor M is grounded to a vehicle body of the electric vehicle.

One end of the rotary shaft 2 of the motor M extends into a housing member 80 of a reducer R (as an example of a machine in which the mechanical seal installed) provided adjoining thereto, and a gear unit G is attached to the one end of the rotary shaft 2. The gear unit G is configured to reduce a rotation speed of the rotary shaft 2 and output the reduced rotation speed to an axle 90 drivably connected thereto, to obtain a torque proportional to a reduction ratio. In the interior of the housing member 80 of the reducer R, oil (as an example of a sealed fluid) for lubricating the gear unit G is stored.

The housing member 50 of the motor M and the housing member 80 of the reducer R are made of a material having electrical conductivity, such as iron. An opening portion 50*a* of the housing member 50 and an opening portion 80*a* of the housing member 80 are opposed to each other, and are butt-welded and integrally fixed to each other in a state where the rotary shaft 2 extends therethrough, so that the interior of the housings is in a sealed state. The housing member 80 of the reducer R connected to the housing member 50 of the motor M may be grounded to the vehicle body of the electric vehicle.

A mechanical seal 1 according to the present embodiment is attached to an outer periphery of the rotary shaft 2 and partitions a space S2 in the interior of the housing member 80 of the reducer R, in which oil is sealed, and a space S1 in the interior of the housing member 50 of the motor M in a sealed state to protect an electrical machine such as the rotor 30, the stator 40, and the like which are vulnerable to oil stored in the space S1. The rotary shaft 2 is rotatably supported by a ball bearing 71 provided adjacent to the mechanical seal 1 in the interior of the housing member 80 of the reducer R, and the pair of ball bearings 70, 70 arranged on the stator 40, and the rotary shaft 2 is prevented from being inclined with respect to the housing member 50 of the motor M and the housing member 80 of the reducer R.

Figure 2:
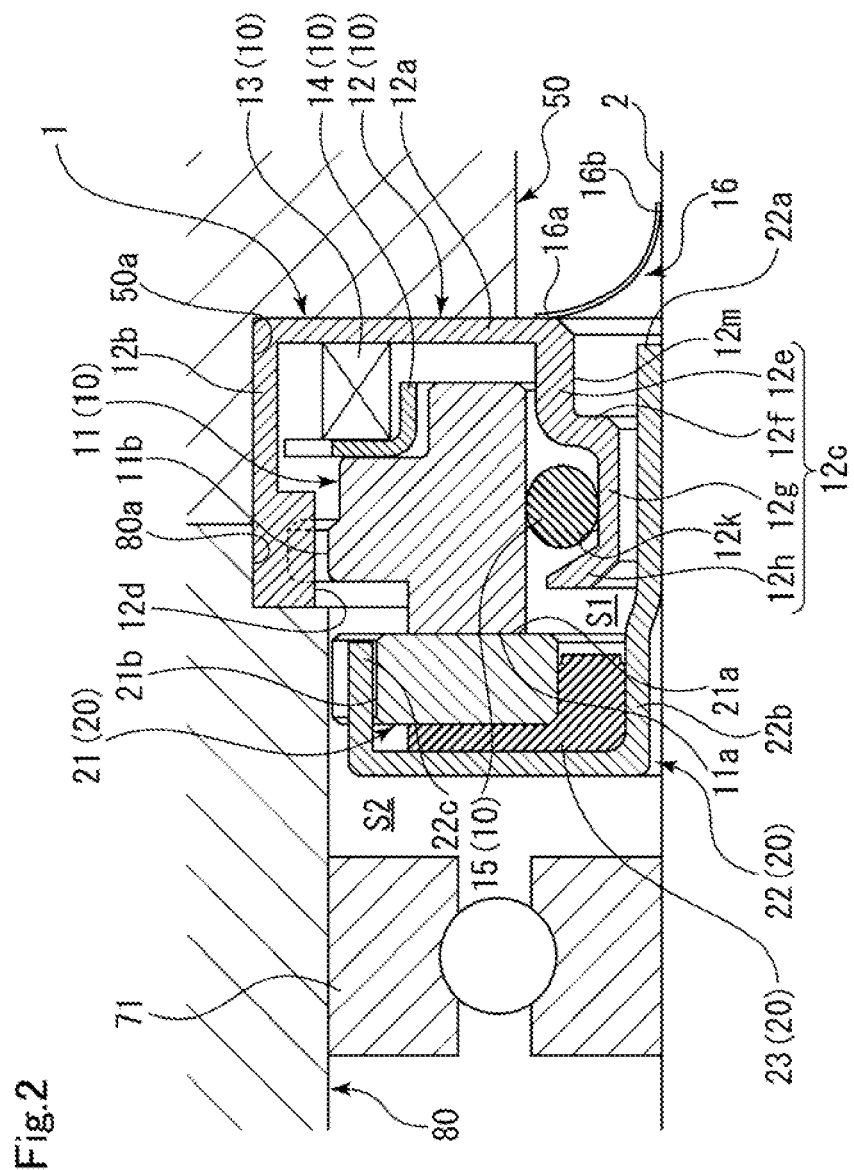
FIG. 2 is an enlarged cross-sectional view showing a configuration of the mechanical seal according to the first embodiment.
Figure 3:
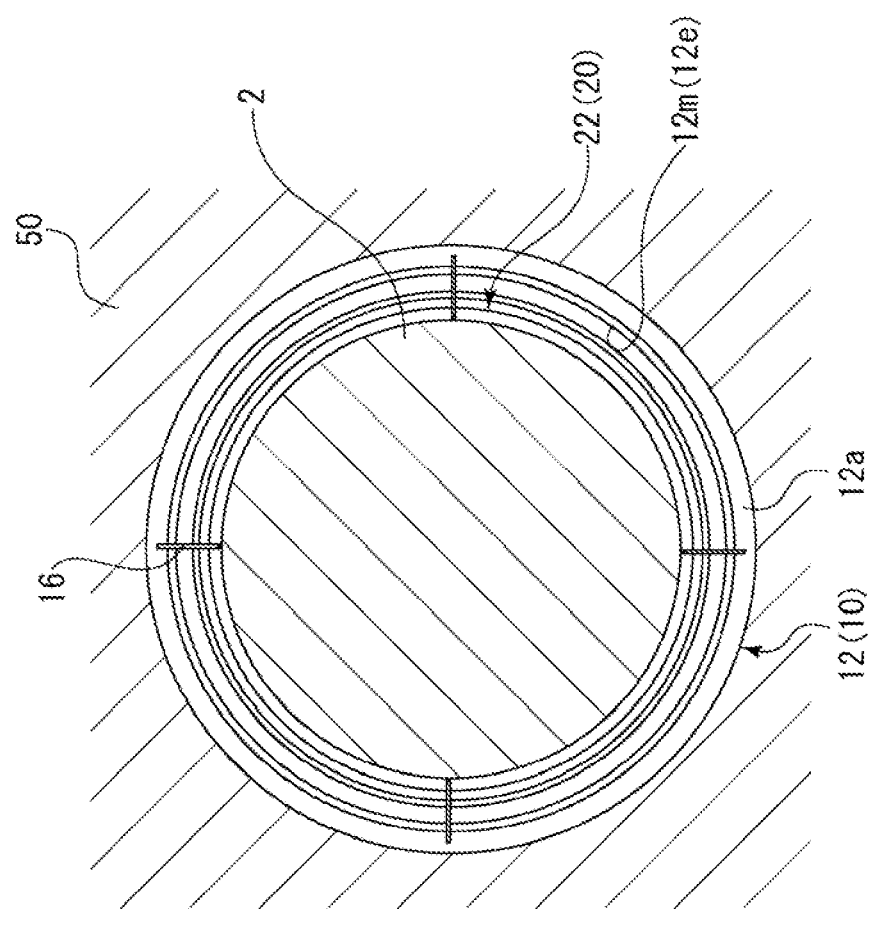
FIG. 3 is a view showing installation positions of conductive elements in a mechanical seal according to the first embodiment.

As shown in FIG. 2, the mechanical seal 1 includes a sliding contact surface 11*a* of a seal ring 11 as a fixed seal ring constituting a fixed sealing element 10, and a sliding contact surface 21*a* of a mating ring 21 as a rotating seal ring constituting a rotating sealing element 20, and rotate the sliding contact surfaces 11*a* and 21*a* relative to each other in a butted state, so that a seal portion is formed between the sliding contact surfaces 11*a* and 21*a* to seal oil which tends to leak from the space S2 in the interior of the housing member 80 of the reducer R toward the space S1 in the interior of the housing member 50 of the motor M located on the atmosphere side.

The seal ring 11 according to the present embodiment is made of carbon having electrical conductivity, and the mating ring 21 is made of SiC. Any sliding material forming the seal ring 11 and the mating ring 21 is applicable as long as it is used as a sliding material for mechanical seal. Further, the SiC includes a sintered compact with boron, aluminum, carbon or the like as sintering aids, as well as a material composed of two or more phases having different components and compositions, for example, SiC in which graphite particles are dispersed, reaction-sintered SiC composed of SiC and Si, SiC—TiC, SiC—TiN, and the like. As carbon, carbon in which a carbonaceous material and a graphite material are mixed, as well as resin-molded carbon, sintered carbon, and the like, can be used. In addition to the sliding materials described above, metal materials, resin materials, surface modification materials (e.g., coating materials), composite materials, and the like are also applicable.

As shown in FIG. 2, the rotating sealing element 20 includes an annular rotating seal ring holder 22 as a holder having a sleeve portion 22a as a rotary shaft member liquid-tightly attached to the outer periphery of the rotary shaft 2, and an annular mating ring 21 provided so as to be rotatable integrally with the rotary shaft 2 via a cup gasket 23 having a substantially L-shaped cross section, which is fixed to a U-shaped holding portion 22b of the rotating seal ring holder 22 in which corner portions have orthogonal angles in cross section. The cup gasket 23 is interposed and pressed between the holding portion 22b of the rotating seal ring holder 22 and the mating ring 21, so that leakage of oil between the holding portion 22b of the rotating seal ring holder 22 and the mating ring 21 is prevented. A material of the cup gasket 23 is not limited to rubber, and may be resin or the like as long as it is made of an elastic material. Further, according to the present embodiment, in the rotating seal ring holder 22, the sleeve portion 22a and the holding portion 22b are integrally formed, but the rotating seal ring holder 22 does not need to have the functions of the sleeve portion 22a and the holding portion 22b, and they may be separately provided.

The mating ring 21 has a notched insertion portion 21b formed on the outer peripheral side. Into the insertion portion 21b, a drive plate 22c, which constitutes a radially outer portion of the holding portion 22b of the rotating seal ring holder 22 and extends toward the atmosphere side in the axial direction, is inserted, so that the mating ring 21 can rotate integrally with the rotary shaft 2.

As shown in FIG. 2, the fixed sealing element 10 mainly includes the annular seal ring 11, and an annular fixed seal ring holder 12 as a holder liquid-tightly attached to the inner periphery of the housing member 50 of the motor M and the housing member 80 of the reducer R. The seal ring 11 is biased in the axial direction against the mating ring 21 via an annular retainer 14 by biasing means 13 which is an annular compression spring held in the interior of the fixed seal ring holder 12. In addition, a regulating protrusion 12d, which protrudes radially inward from an inner periphery of a first cylindrical portion 12b described later, is inserted into a notched insertion portion 11b formed on the outer peripheral side of the seal ring 11, so that the rotation of the seal ring 11 relative to the fixed seal ring holder 12 is prevented.

The fixed seal ring holder 12 is formed by pressing a metal plate having electrical conductivity and is formed in an annular shape having a U-shape in which corner portions have orthogonal angles in cross section. The fixed seal ring holder 12 includes an annular base portion 12a extending in the radial direction, the first cylindrical portion 12b extending in the axial direction from a radially outer portion of the base portion 12a to the oil side, and a stepped second cylindrical portion 12c extending in the axial direction from a radially inner portion of the base portion 12a to the oil side.

Further, the first cylindrical portion 12b is inserted into and fitted to the recesses formed in the opening portion 50a of the housing member 50 of the motor M and the opening portion 80a of the housing member 80 of the reducer R to be interposed therebetween in the axial direction. Therefore, the fixed seal ring holder 12 is securely in contact with the housing member 50 of the motor M and the housing member 80 of the reducer R.

Further, the second cylindrical portion 12c is formed of a base portion side cylindrical portion 12e connecting perpendicularly to the base portion 12a and extending in the axial direction, a side plate portion 12f connecting perpendicularly to the base portion side cylindrical portion 12e and extending radially inward, an end plate side cylindrical portion 12g connecting perpendicularly to the side plate portion 12f and extending in the axial direction, and an end plate portion 12h connecting obliquely to the endplate side cylindrical portion 12g and extending radially outward.

Further, in the second cylindrical portion 12c, an annular recessed groove 12k is formed by the side plate portion 12f, the end plate side cylindrical portion 12g, and the end plate portion 12h to be recessed radially inward. The seal ring 11 is attached via an O-ring 15 externally fitted to the annular recessed groove 12k, so that leakage of oil between the seal ring 11 and the fixed seal ring holder 12 is prevented. The material of the O-ring 15 is not limited to rubber and may be resin or the like as long as it is made of an elastic material.

Further, on the inner periphery side (that is, on the side of the rotary shaft 2) of the second cylindrical portion 12c, an annular stepped portion 12m is formed to be exposed to the atmosphere side. The annular stepped portion 12m has a positional relationship such that it overlaps the sleeve portion 22a of the rotating seal ring holder 22 in the axial direction.

Further, on the atmosphere side of the fixed seal ring holder 12, a fixed end 16a of a brush member 16 as a conductive element having electrical conductivity is fixed to the radially inner portion of the base portion 12a, and the brush member 16 has a free end 16b bent in an axial direction of the rotary shaft 2 to be in contact with each other. The brush member 16 is made of metal wire having low rigidity. Further, as shown in FIG. 3, the four brush members 16 are configured to have small dimension in a circumferential direction (that is, in a width direction), and are equiangularly arranged in a circumferential direction of the rotary shaft 2.

Accordingly, since the brush member 16 is provided between the fixed seal ring holder 12 constituting the fixed sealing element 10, and the rotary shaft 2, the electric charge electrified on the rotary shaft 2 can be released through a ground path in the order of the brush member 16, the fixed seal ring holder 12, and the housing member 50 of the motor M, allowing accumulation of electric charge in the rotary shaft 2 to be prevented. In addition, since the brush member 16 is fixed to the fixed seal ring holder 12, which does not rotate together with the rotary shaft 2, the brush member 16 is less likely to be affected by centrifugal force and the like, allowing the structural stability to be improved, and a state of energizing the rotary shaft 2 is thus easily maintained.

Further, by simply attaching the fixed seal ring holder 12 to the inner periphery of the housing member 50 of the motor M and the housing member 80 of the reducer R, the brush member 16 can be positioned with respect to the rotary shaft 2, and the ground path can be established. Further, since the fixed seal ring holder 12 has electrical conductivity, the electric charge electrified on the rotary shaft 2 flows through the brush member 16 and can be then stably released through the fixed seal ring holder 12 to the housing member 50 of the motor M.

Further, since the seal ring 11 held by the fixed seal ring holder 12 has electrical conductivity, the electric charge is less likely to be electrified in the seal ring 11, the electric charge electrified on the rotary shaft 2 is easily released through the ground path, and the electric charge is less likely to be accumulated on the rotary shaft 2.

Further, since the plurality of brush members 16 is scatteredly provided in the circumferential direction of the rotary shaft 2, for an inclination of the rotary shaft 2, the electric charge electrified on the rotary shaft 2 can be released through the ground path connected to any of the brush members 16, and since a contact area between the brush members 16 and the rotary shaft 2 is reduced, a mechanical seal with low torque can be obtained. Furthermore, since the brush members 16 are made of metal wire having low rigidity and have a small dimension in the circumferential direction (that is, in the width direction), the pressing force against the rotary shaft 2 can be reduced, allowing a mechanical seal with low torque to be obtained.

In addition, since the brush member 16 has the free end 16b bent to be in contact in the axial direction of the rotary shaft 2, even for rotation of the rotary shaft 2 in both directions (that is, forward rotation/reverse rotation), the contact state of the free end 16b of the brush member 16 is easily maintained. Furthermore, it becomes easy to follow the axial movement and inclination of the rotary shaft 2, so that the state of energizing the rotary shaft 2 is easily maintained.

Further, the brush member 16 is fixed to the fixed seal ring holder 12 constituting the fixed sealing element 10 of the mechanical seal 1, and thus can be provided with an energizing function. Therefore, as in a motor and a reducer of a conventional electric vehicle, for example, there is no need to separately provide an earth chamber and bring a conductive element such as a carbon brush into contact with the axle 90, allowing saving space and low cost.

In addition, since the brush member 16 is provided in the mechanical seal 1 adjacent to the ball bearings (particularly, the ball bearing 71 located on the oil side), and the ball bearing 71 is thus located near the brush member 16, an instantaneous burst of electrical energy in the ball bearing 71 is easily prevented. Furthermore, since the ball bearing 71 is disposed near the brush member 16, the positioning accuracy of the brush member 16 with respect to the rotary shaft 2 is improved.

In addition, the fixed end 16a of the brush member 16 is not limited to one fixed to the base portion 12a of the fixed seal ring holder 12, but may be fixed to, for example, the annular stepped portion 12m (the base portion side cylindrical portion 12e) formed on the inner peripheral side of the fixed seal ring holder 12. In this case, the free end 16b may be in contact with the rotary shaft 2 or the sleeve portion 22a as a rotary shaft member of the rotating seal ring holder 22.

Further, the radially inner portion of the base portion 12a of the fixed seal ring holder 12 and the annular stepped portion 12m of the second cylindrical portion 12c are located radially inward of a through hole of the housing members 50, 80, through which the rotary shaft 2 extends, that is, they are located closer to the rotary shaft 2 than an inner periphery of the through hole. Thus, since the brush member 16 is disposed in these portions, the brush member 16 can be formed smaller in the radial direction.

Second Embodiment

Figure 4:
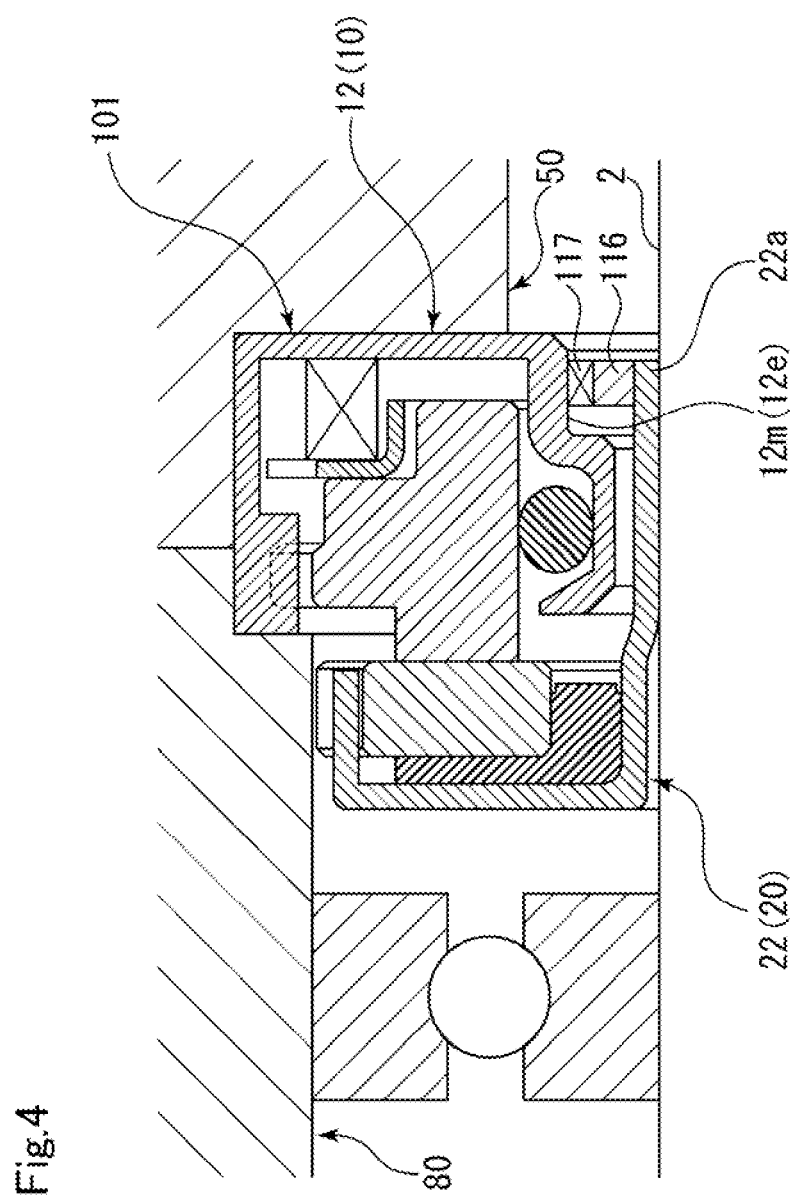
FIG. 4 is an enlarged cross-sectional view showing a configuration of a mechanical seal according to a second embodiment of the present invention.
Figure 5:
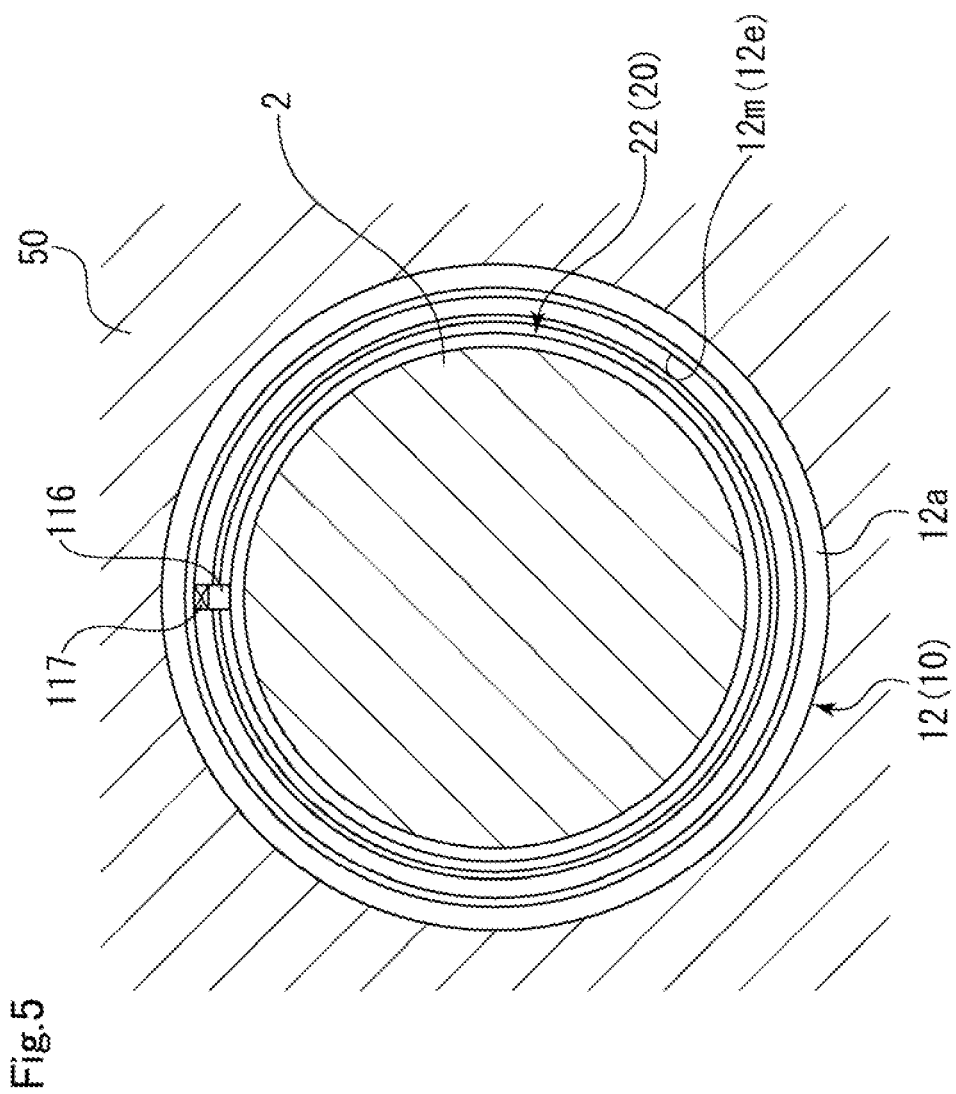
FIG. 5 is a view showing an installation position of a conductive element in the mechanical seal according to the second embodiment.

Next, a mechanical seal according to a second embodiment of the present invention will be described with reference to FIGS. 4 and 5. The same components as those shown in the embodiment described above are denoted by the same reference numerals, and redundant description will be omitted.

A mechanical seal 101 according to the second embodiment will be described. As shown in FIG. 4, according to the present embodiment, in the base portion side cylindrical portion 12e of the annular stepped portion 12m of the fixed seal ring holder 12, a carbon brush 116 as a conductor or a conductive element having electrical conductivity is provided so as to be biased radially inward by biasing means 117, which is a pressing spring as a conductive element having electrical conductivity. The carbon brush 116 is thus pressed against the sleeve portion 22a as a rotary shaft member of the rotating seal ring holder 22.

Accordingly, since the carbon brush 116 and the biasing means 117 are provided between the fixed seal ring holder 12 constituting the fixed sealing element 10 and the sleeve portion 22a as a rotary shaft member of the rotating seal ring holder 22, the electric charge electrified on the rotary shaft 2 can be released through the ground path in the order of the sleeve portion 22a of the rotating seal ring holder 22, the carbon brush 116, the biasing means 117, the fixed seal ring holder 12, and the housing member 50 of the motor M, allowing charge accumulation on the rotary shaft 2 to be prevented.

Further, since the carbon brush 116 is biased radially inward by the biasing means 117, not only for the axial movement and inclination of the rotary shaft 2 but also for the vibration due to disturbance or the like, the contact state of the carbon brush 116 with the sleeve portion 22a of the rotating seal ring holder 22 can easily maintained. Therefore, as shown in FIG. 5, one carbon brush 116 and one biasing means 117 only need to be provided in the circumferential direction of the sleeve portion 22a (the rotary shaft 2). In addition, a plurality of carbon brushes 116 and a plurality of biasing means 117 may be scatteredly provided in the circumferential direction of the sleeve portion 22a.

In addition, since the carbon brush 116 as a conductive element is in contact with the sleeve portion 22a of the rotating seal ring holder 22 to be energized, the material and surface shape of the sleeve portion 22a can be selected and designed so as to be suitable for the conductive element, so that the energized state is easily maintained. Furthermore, the carbon brush 116 and the biasing means 117 can be incorporated into the mechanical seal 101 to form a unit, and the distance of a gap between the fixed seal ring holder 12 and the sleeve portion 22a, in which the carbon brush 116 and the biasing means 117 are provided, is kept constant, so that energization can be ensured.

Third Embodiment

Figure 6:
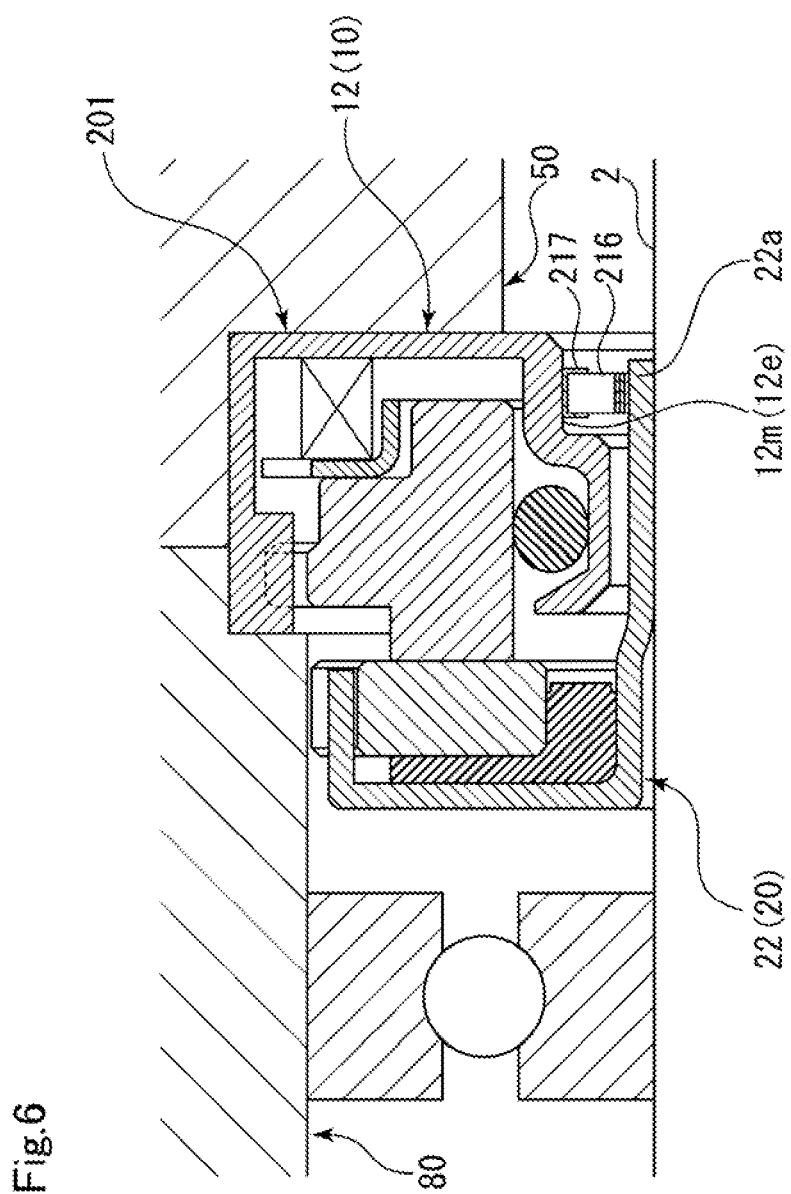
FIG. 6 is an enlarged sectional view showing a configuration of a mechanical seal according to a third embodiment of the present invention.
Figure 7:
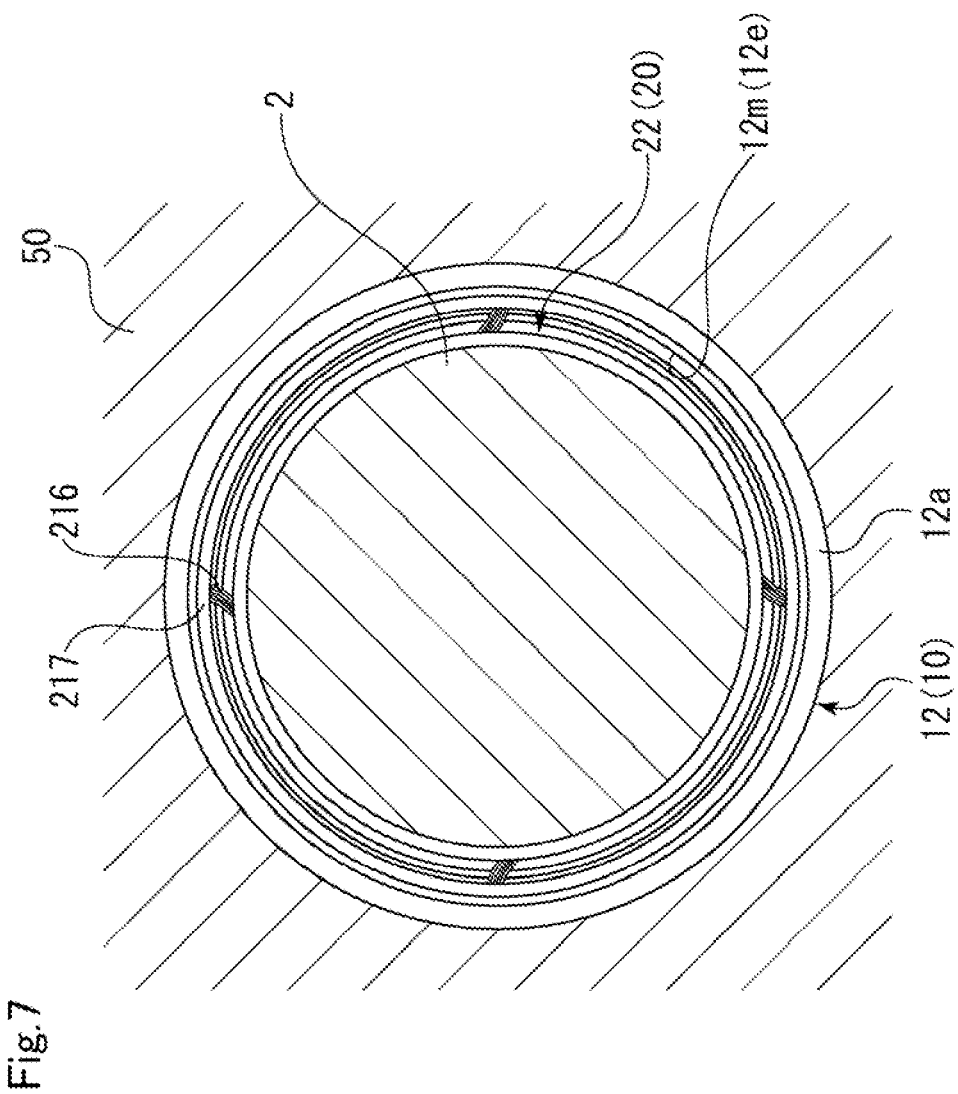
FIG. 7 is a view showing installation positions of conductive elements in the mechanical seal according to the third embodiment.

Next, a mechanical seal according to a third embodiment of the present invention will be described with reference to FIGS. 6 and 7. The same components as those shown in the embodiments described above are denoted by the same reference numerals, and redundant description will be omitted.

A mechanical seal 201 according to the third embodiment will be described. As shown in FIG. 6, according to the present embodiment, in the base portion side cylindrical portion 12e of the annular stepped portion 12m of the fixed seal ring holder 12, a leaf member 216 (as an example of a conductive element) is provided, which is held by a holding member 217 having electrical conductivity and having a U-shape in which corner portions have orthogonal angles in cross section, and is formed of conductive thin plates having their plate surfaces arranged side by side in the circumferential direction. As shown in FIG. 7, four leaf members 216 are configured to have small dimension in the circumferential direction (i.e., in the width direction), and are equiangularly arranged in the circumferential direction of the rotating seal ring holder 22 (or the rotary shaft 2).

Accordingly, since the leaf member 216 is provided between the fixed seal ring holder 12 constituting the fixed sealing element 10 and the sleeve portion 22a as a rotary shaft member of the rotating seal ring holder 22, the electric charge electrified on the rotary shaft 2 is released through the ground path in the order of the sleeve portion 22a of the rotating seal ring holder 22, the leaf member 216, the fixed seal ring holder 12, and the housing member 50 of the motor M, allowing charge accumulation on the rotary shaft 2 to be prevented.

Further, since the leaf member 216 is used as a conductive element, the distal ends of the thin plates constituting the leaf member 216 are in contact in the axial direction of the sleeve portion 22a of the rotating seal ring holder 22, so that a wide contact area can be secured.

Further, since the thin plates constituting the leaf member 216 is likely to be bent in the circumferential direction, it is easy to maintain a state in which the leaf member 216 is in contact with the sleeve portion 22a of the rotating seal ring holder 22 in the axial direction.

Fourth Embodiment

Figure 8:
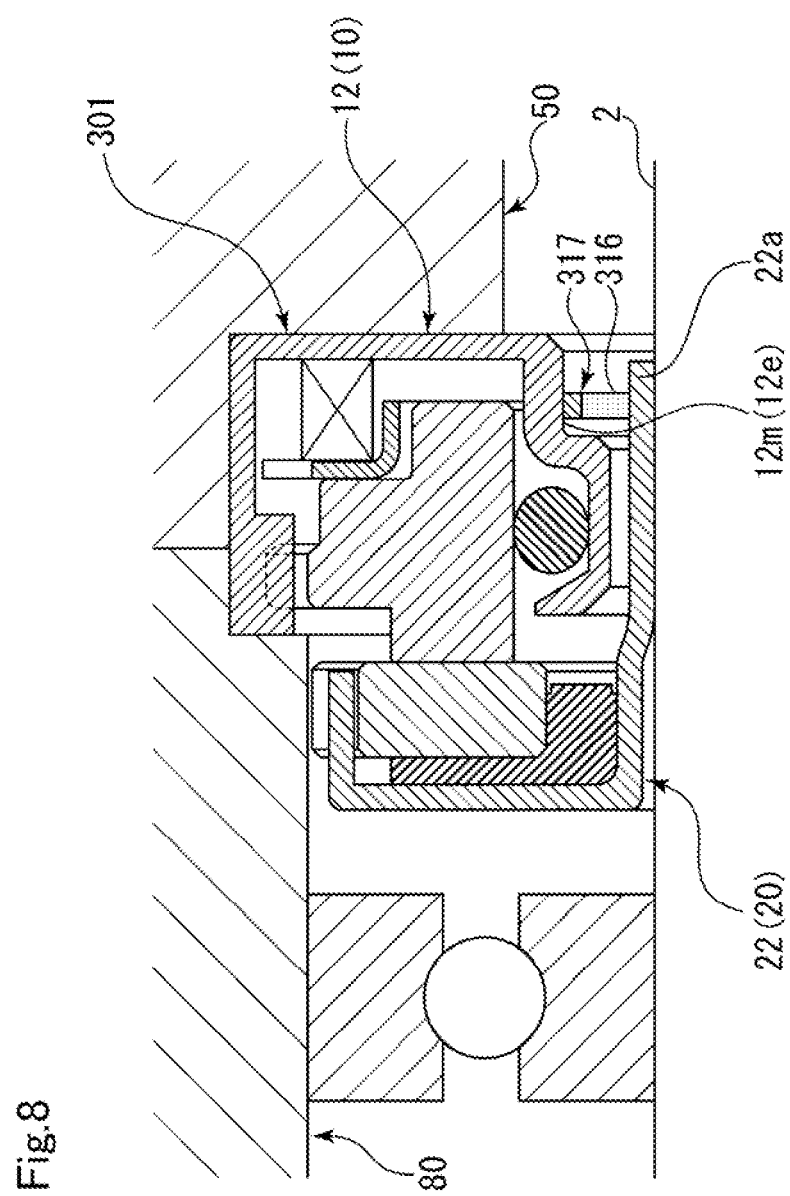
FIG. 8 is an enlarged sectional view showing a configuration of a mechanical seal according to a fourth embodiment of the present invention.
Figure 9:
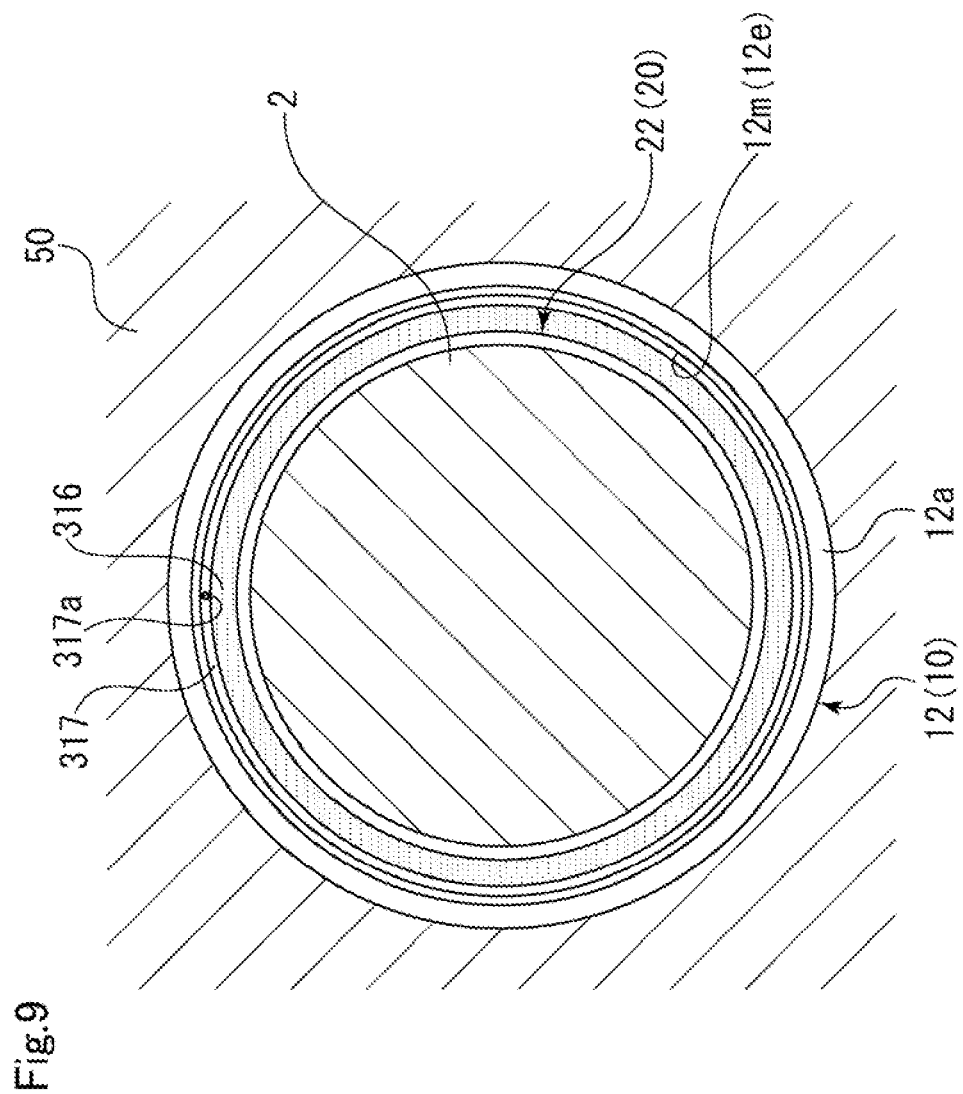
FIG. 9 is a view showing an installation position of a conductive element in the mechanical seal according to the fourth embodiment.

Next, a mechanical seal according to a fourth embodiment or the present invention will be described with reference to FIGS. 8 and 9. The same components as those shown in the embodiments described above are denoted by the same reference numerals, and redundant description will be omitted.

A mechanical seal 301 according to the fourth embodiment will be described. As shown in FIGS. 8 and 9, in the present embodiment, an annular magnet 317 as a conductive element provided with a through hole 317a (see FIG. 9) for introducing air, is fixed to the base portion side cylindrical portion 12e of the annular stepped portion 12m of the fixed seal ring holder 12, and a fluid film composed of a magnetic fluid 316 as a conductive element is held between the magnet 317 and the sleeve portion 22a of the rotating seal ring holder 22 in the circumferential direction.

Accordingly, since the magnetic fluid 316 and the magnet 317 are provided between the fixed seal ring holder 12 constituting the fixed sealing element 10 and the sleeve portion 22a as a rotary shaft member of the rotating seal ring holder 22, the electric charge electrified on the rotary shaft 2 can be released through the ground path in the order of the sleeve portion 22a of the rotating seal ring holder 22, the magnetic fluid 316, the magnet 317, the fixed seal ring holder 12, and the housing member 50 of the motor M, allowing charge accumulation on the rotary shaft 2 to be prevented.

Further, the frictional resistance between the fluid film composed of the magnetic fluid 316 and the sleeve portion 22a of the rotating seal ring holder 22 can be reduced, so that a mechanical seal with low torque can be obtained.

Fifth Embodiment

Figure 10:
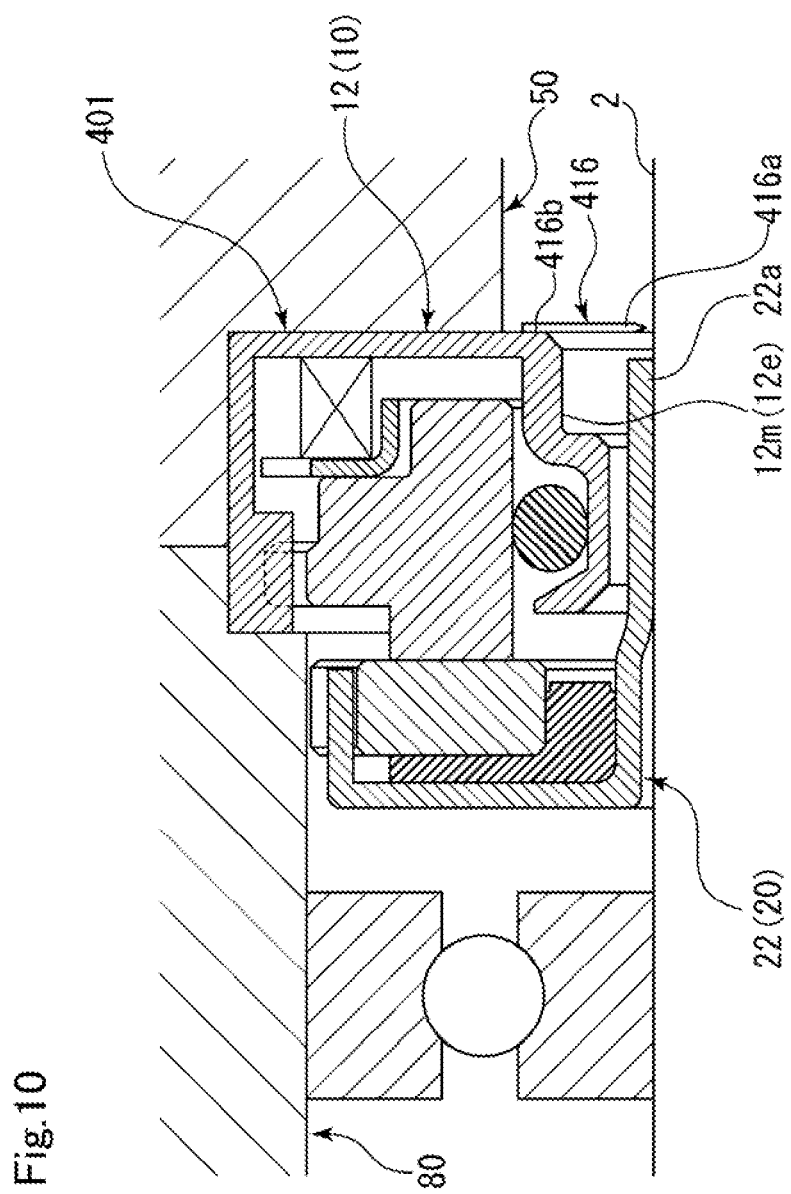
FIG. 10 is an enlarged sectional view showing a configuration of a mechanical seal according to a fifth embodiment of the present invention.
Figure 11:
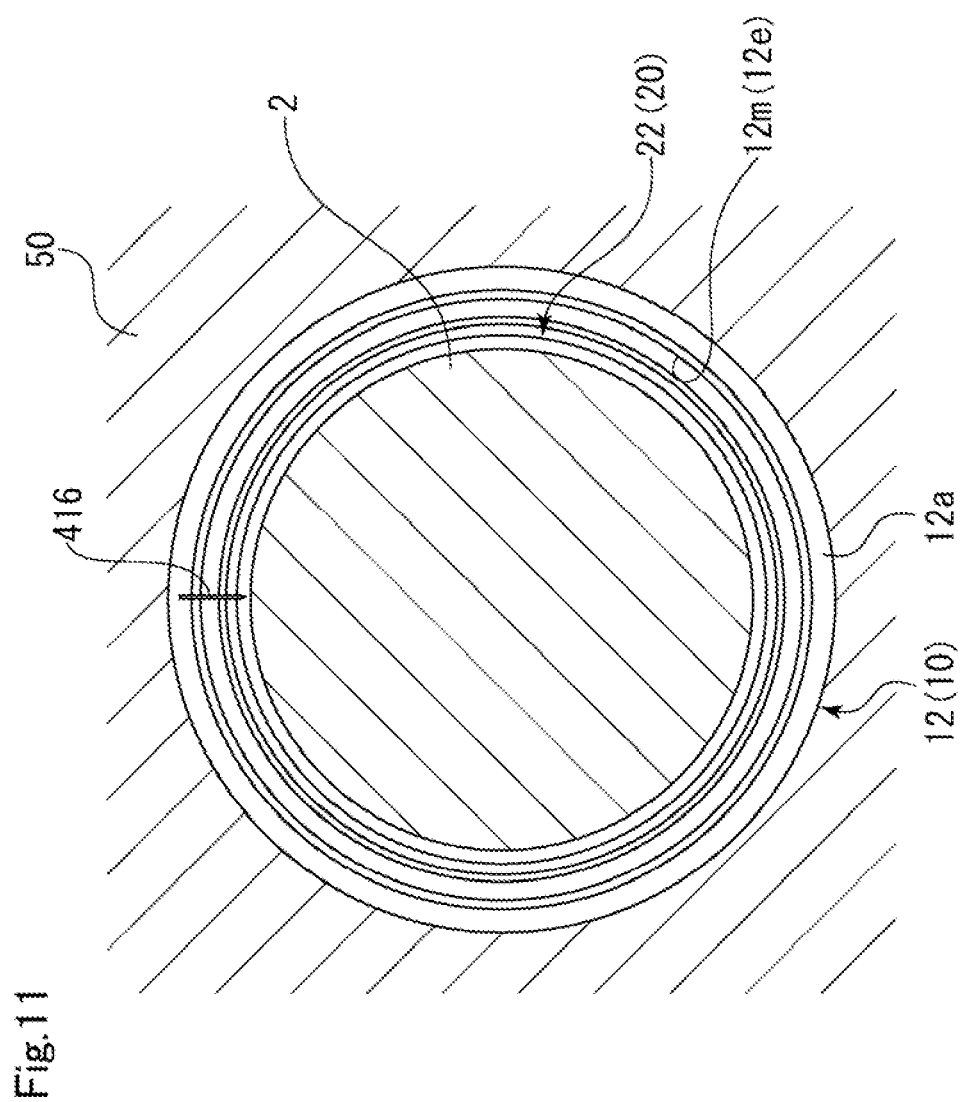
FIG. 11 is a view showing an installation position of a conductive element in the mechanical seal according to the fifth embodiment.

Next, a mechanical seal according to a fifth embodiment of the present invention will be described with reference to FIGS. 10 and 11. The same components as those shown in the embodiments described above are denoted by the same reference numerals, and redundant description will be omitted.

A mechanical seal 401 according to the fifth embodiment will be described. As shown in FIGS. 10 and 11, in the present embodiment, on the atmosphere side of the fixed seal ring holder 12, a fixed end 416a of a discharge needle 416 as a conductive element having electrical conductivity is fixed to the radially inner portion of the base portion 12a, and a needle-shaped free end 416b is held in a non-contact state with the rotary shaft 2. The discharge needle 416 is formed of metal wire having low rigidity.

Accordingly, since the discharge needle 416 is provided between the fixed seal ring holder 12 constituting the fixed sealing element 10 and the rotary shaft 2, the electric charge electrified on the rotary shaft 2 can be released through the ground path in the order of the discharge needle 416, the fixed seal ring holder 12, and the housing member 50 of the motor M, allowing charge accumulation on the rotary shaft 2 to be prevented.

In addition, since ions having a charge opposite to the electric charge electrified on the rotary shaft 2 are attracted to the free end 416b of the discharge needle 416, the charge can be electrically neutralized. Therefore, the electric charge is less likely to be accumulated on the rotary shaft 2, an instantaneous burst of electrical energy can be prevented. Furthermore, since the free end 416b of the discharge needle 416 is always in a non-contact state with the rotary shaft 2, wear of the discharge needle 416 can be prevented.

The fixed end 416a of the discharge needle 416 is not limited to the one fixed to the base portion 12a of the fixed seal ring holder 12, but may be fixed, for example, to the base portion side cylindrical portion 12e of the annular stepped portion 12m formed on the inner peripheral side of the fixed seal ring holder 12, or to the side plate portion 12f constituting the annular recessed groove 12k.

The embodiments according to the present invention have been described above with reference to the drawings, however, the specific configuration is not limited to these embodiments.

For example, in the embodiments described above, a mechanical seal provided with a conductive element is described as a so-called inside type mechanical seal in which a seal portion formed between the sliding contact surfaces 11a and 21a of the sealing ring 11 and the mating ring 21 seals oil which tends to leak from the space S2 in the interior of the housing member 80 of the reducer R on the outer peripheral side to the space S1 in the interior of the housing member 50 of the motor M on the inner peripheral side, and a so-called stationary type mechanical seal in which the sealing ring 11 is axially biased toward the mating ring 21 by the biasing means 13. However, the conductive element may be provided in an outside type or rotary type mechanical seal.

In the embodiments described above, as an example of installation of a conductive element for the mechanical seal, the installation of the conductive element for the mechanical seal for sealing a space between the housing members 50, 80 and the rotary shaft 2 between the motor M and the reducer R has been described, however, is not limited thereto, and the conductive element may be provided in, for example, a mechanical seal provided on a rotary shaft of a water pump, etc.

Further, in the embodiments described above, the conductive element is described as being fixed to the fixed sealing element 10 (the fixed seal ring holder 12) constituting the mechanical seal, however is not limited to this. The conductive element may be fixed to the rotary shaft 2 or the rotating seal ring holder 22 (e.g., the sleeve portion 22a) as long as it is provided between the fixed sealing element 10 and the rotary shaft 2 or the sleeve portion 22a as a rotary shaft member of the rotating seal ring holder 22. For example, the conductive element fixed to the sleeve portion 22a of the rotating seal ring holder 22 may be in contact with the end plate portion 12h of the second cylindrical portion 12c, or the like. Further, the conductive element may be either in contact with or non-contact with other portions at the free end side.

One end of the conductive element may be in direct contact with the housing as long as part of the conductive element is provided between the fixed sealing element 10 and the rotary shaft 2 or the sleeve portion 22a as a rotary shaft element of the rotating seal ring holder 22. In this case, the fixed sealing element does not need to have electrical conductivity.

Further, at least one conductive element according to the first to third embodiments and the fifth embodiment only needs to be provided in the circumferential direction.

The conductive elements according to the first to third embodiments only needs to be in contact with at least one of the rotary shaft 2 and the sleeve portion 22a of the rotating seal ring holder 22.

The material of the conductive element may be freely selected as long as the conductive element is formed of a material having electrical conductivity, however, it is preferable that the conductive element is formed of a material having high wear resistance to friction with the rotary shaft 2 or the sleeve portion 22a of the rotating seal ring holder 22.

The material of the rotary shaft 2 or the rotating seal ring holder 22 (e.g., the sleeve portion 22a), the housing member 50 of the motor M, the housing member 80 of the reducer R, the fixed seal ring holder 12 and the like can be freely selected as long as they are formed of a material having electrical conductivity. In the rotating seal ring holder 22, at least the sleeve portion 22a, which is in contact with the conductive element, only needs to be formed of a material having electrical conductivity.

REFERENCE SIGNS LIST 1 to 401 mechanical seal
2 rotary shaft
10 fixed sealing element
11 seal ring (fixed seal ring)
11a sliding contact surface
12 fixed seal ring holder (holder)
12a base portion
12b first cylindrical portion
12c second cylindrical portion
12d regulating protrusion
12e base portion side cylindrical portion
12f side plate portion
12g end plate side cylindrical portion
12h end plate portion
12k annular recessed groove
12m annular stepped portion
16 brush member (conductive element)
16a fixed end
16b free end
20 rotating sealing element
21 mating ring (rotating seal ring)
21a sliding contact surface
22 rotating seal ring holder
22a sleeve portion (rotary shaft member)
22b holding portion
50, 80 housing member
70, 71 ball bearing
116 carbon brush (conductor, conductive element)
117 biasing means (conductive element)
216 leaf member (conductive element)
316 magnetic fluid (conductive element)
317 magnet (conductive element)
416 discharge needle (conductive element)
416a fixed end
416b free end
G gear unit
M motor (machine to be installed)
R reducer (machine to be installed)
S1, S2 space

The invention claimed is:

1. A mechanical seal comprising:
a fixed sealing element including at least a fixed seal ring and held at an inner periphery of a housing of a machine in which the mechanical seal is to be installed; and
a rotating sealing element including at least a rotating seal ring and held at an outer periphery of a rotary shaft rotatably supported in the housing, wherein
the fixed sealing element includes a fixed seal ring holder having electrical conductivity and provided with an annular base portion extending in a radial direction and a cylindrical portion extending in an axial direction from a radially outer portion of the base portion toward a side of the fixed sealing ring,
the fixed seal ring is held by the fixed seal ring holder so as to be housed in an inner space partially defined by the base portion and the cylindrical portion, and
the mechanical seal further comprises an electrically conductive element having a first end fixed to at least one of the base portion and the cylindrical portion of the fixed seal ring holder and a second end brought into contact with the rotary shaft or a rotary shaft member fixed to the rotary shaft, or close to the rotary shaft or the rotary shaft member with a small gap.

2. The mechanical seal according to claim 1, wherein the electrically conductive element is capable of energizing the rotary shaft.

3. The mechanical seal according to claim 2, wherein the rotary shaft member has a holding portion for holding the rotating seal ring.

4. The mechanical seal according to claim 2, wherein the fixed seal ring holder is an annular holder attached to the inner periphery of the housing.

5. The mechanical seal according to claim 2, wherein the fixed seal ring has electrical conductivity.

6. The mechanical seal according to claim 2, comprising a plurality of said electrically conductive elements arranged in a circumferential direction.

7. The mechanical seal according to claim 1, wherein the electrically conductive element is capable of energizing the rotary shaft member.

8. The mechanical seal according to claim 7, wherein the rotary shaft member has a holding portion for holding the rotating seal ring.

9. The mechanical seal according to claim 7, wherein the fixed seal ring holder is an annular holder attached to the inner periphery of the housing.

10. The mechanical seal according to claim 7, wherein the fixed seal ring has electrical conductivity.

11. The mechanical seal according to claim 7, comprising a plurality of said electrically conductive elements arranged in a circumferential direction.

12. The mechanical seal according to claim 1, wherein the rotary shaft member has a holding portion for holding the rotating seal ring.

13. The mechanical seal according to claim 1, wherein the fixed seal ring holder is an annular holder attached to the inner periphery of the housing.

14. The mechanical seal according to claim 1, wherein the fixed seal ring has electrical conductivity.

15. The mechanical seal according to claim 1, comprising a plurality of said electrically conductive elements arranged in a circumferential direction.

16. The mechanical seal according to claim 1, wherein the electrically conductive element has a free end brought into contact with the rotary shaft or the rotary shaft member so as to bend in an axial direction.

17. The mechanical seal according to claim 1, wherein the electrically conductive element comprises a conductor and a biasing device which has electrical conductivity and which is configured to bias the conductor toward the rotary shaft.

18. The mechanical seal according to claim 1, wherein the electrically conductive element is formed of a plurality of thin plates having plate surfaces arranged side by side in a circumferential direction.

19. The mechanical seal according to claim 1, wherein the electrically conductive element is formed of a magnet and a magnetic fluid.

20. The mechanical seal according to claim 1, wherein the electrically conductive element is a discharge needle having a free end in a non-contact state.

* * * * *